Nov. 30, 1948.  T. R. WIESEMAN  2,454,955
ROTOR FOR ELECTRIC MOTORS AND
METHOD OF MAKING THE SAME
Filed June 7, 1947  3 Sheets-Sheet 2
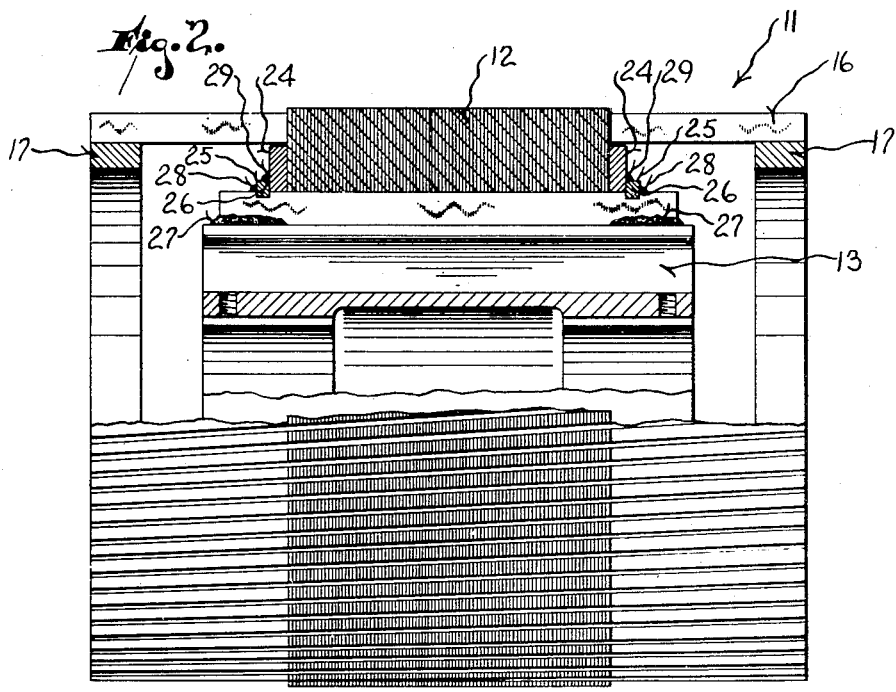
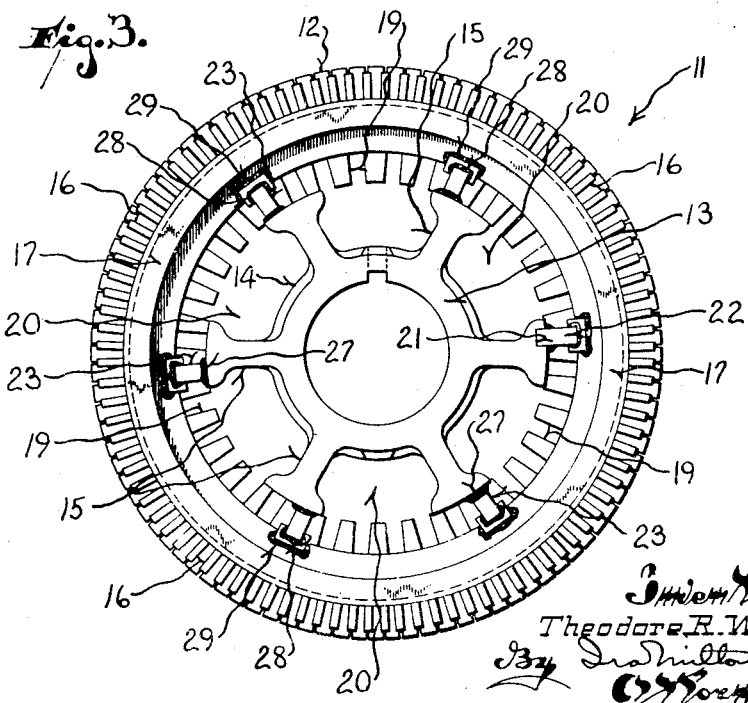
Inventor
Theodore R. Wieseman Nov. 30, 1948.     T. R. WIESEMAN     2,454,955
ROTOR FOR ELECTRIC MOTORS AND
METHOD OF MAKING THE SAME Filed June 7, 1947     3 Sheets-Sheet 3

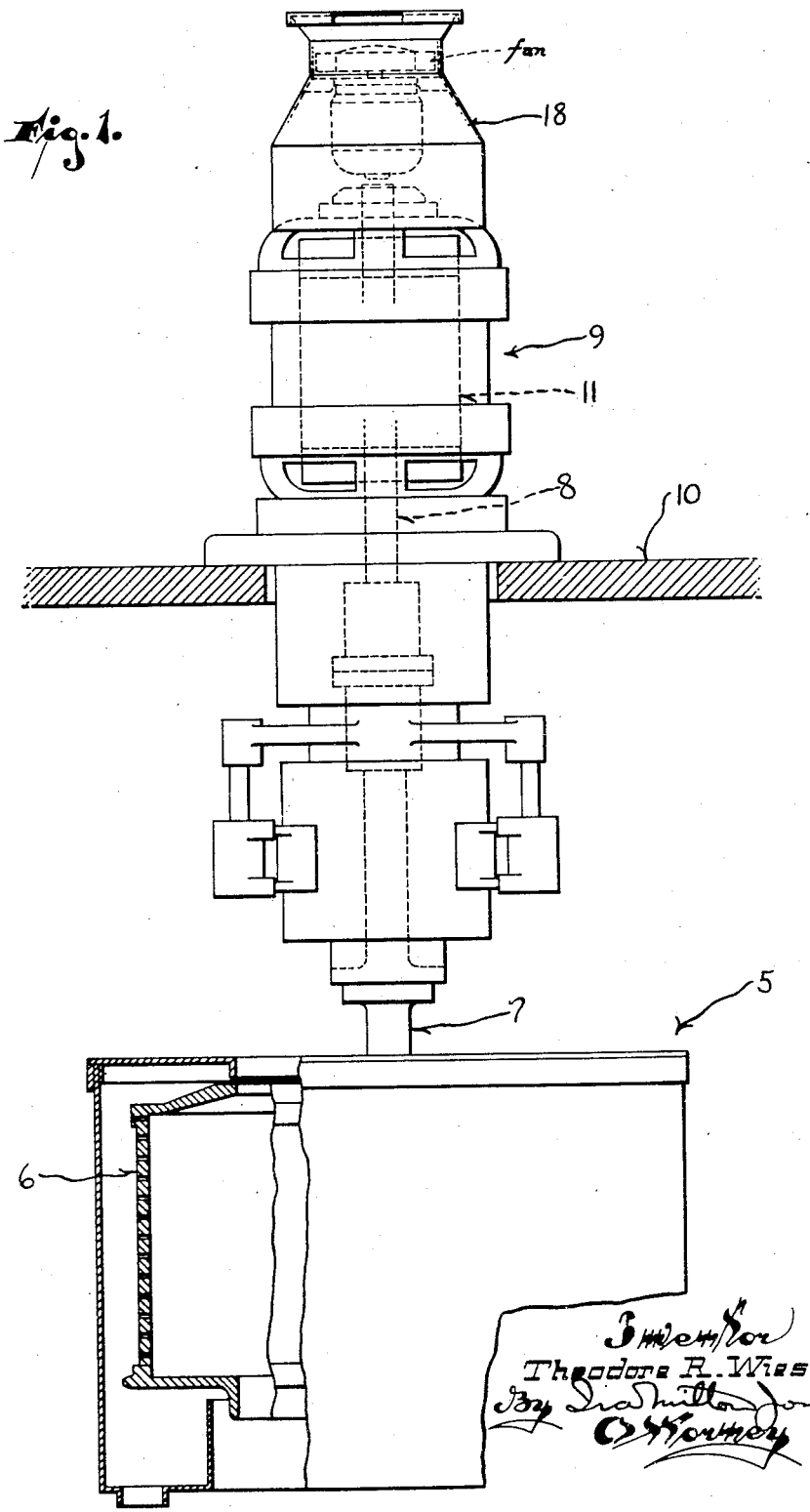

Inventor
Theodore R. Wieseman

Patented Nov. 30, 1948

2,454,955

UNITED STATES PATENT OFFICE 2,454,955

ROTOR FOR ELECTRIC MOTORS AND METHOD OF MAKING THE SAME

Theodore R. Wieseman, Milwaukee, Wis., assignor to The Louis Allis Company, Milwaukee, Wis., a corporation of Wisconsin Application June 7, 1947, Serial No. 753,155

6 Claims. (Cl. 171—252)

1

This invention relates to electric motors and has as a general object to improve the dissipation of heat from the rotor thereof.

While the dissipation of heat developed in electric motors has always received much consideration from motor manufacturers and designers, the demands imposed upon the drive motors of certain types of centrifugal separators presented a problem in heat dissipation which confounded the industry for many years. The problem was especially acute in the drive motors of centrifugal separators used in sugar refineries where the maintenance of the desired output entails very short cycles of operation repeated in close succession. Though all known expedients and "tricks" were tried, no means was known prior to this invention for satisfactorily dissipating the heat developed in the rotors of such centrifugal separator drive motors.

Centrifugal separators of the type concerned have the basket suspended from above and driven directly from the drive shaft of the motor. In sugar refineries the separator baskets are generally loaded in a few seconds with 800 to 1000 pounds of syrup while the basket is being accelerated. Full speed is reached in about forty-five (45) seconds; and after a run of approximately one minute, the basket is brought to a stop in about thirty (30) seconds.

Motors used for this service are of the multispeed type; regenerative braking, that is, connecting the motor for operation on slow speed, being employed to decelerate the basket sufficiently to enable mechanical brakes to take over.

The production demands made upon this equipment entail at least twenty-four (24) cycles every hour. It is thus evident that the problem of dissipating heat developed in a motor operating under such conditions is extremely serious. Experience proved that none of the known expedients for dissipating the developed heat were satisfactory. Increasing the length of the rotor bars to the maximum permitted by the frame dimensions did not suffice. Likewise increasing the amount of air moving through the machine failed to prevent excessive overheating.

With a view toward correcting this objectionable condition, this invention resides in the novel construction, combination and arrangement of parts substantially as hereinafter described, and more particularly defined by the appended claims, it being understood that such changes in the precise embodiment of the hereindisclosed invention may be made as come within the scope of the claims.

2

Figure 1 is a side elevational view of a centrifugal separator illustrating an application of this invention;

Figure 2 is a view partially in side elevation and partially in longitudinal section of the rotor of an electric motor, constructed in accordance with this invention;

Figure 3 is an end view thereof; and

Figure 4:
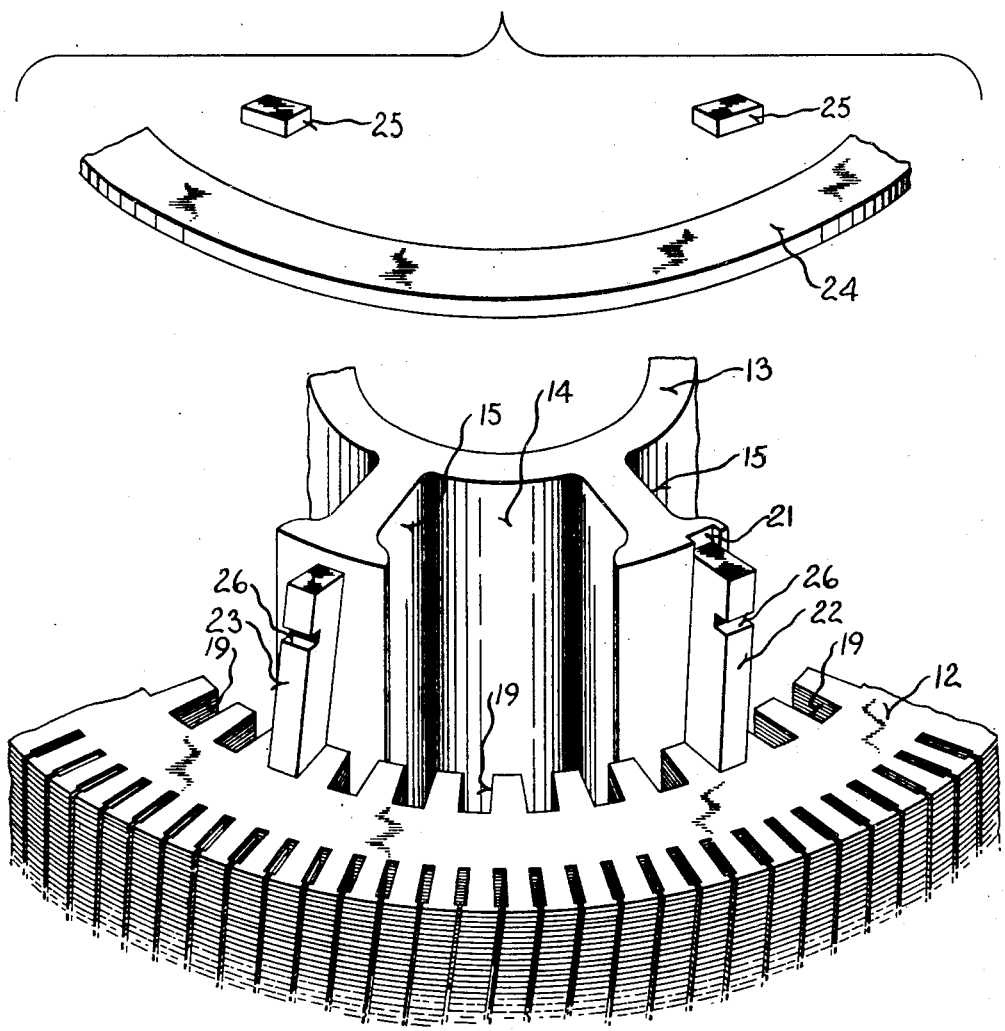
Figure 4 is a perspective view showing a portion of the rotor in an intermediate stage of completion to illustrate the manner in which it is constructed.

Referring now particularly to the accompanying drawings in which like numerals indicate like parts, the numeral 5 designates a centrifugal separator which as is customary includes a rotatable basket 6. This basket is driven by and supported from a shaft 7 which extends upwardly therefrom to be drivingly connected with the shaft 8 of an electric motor 9. The motor 9 is mounted vertically on a suitable support 10. A direct driving connection thus exists between the motor shaft 8 and the basket 6 of the centrifugal separator.

Inasmuch as this invention is concerned chiefly with the construction of the rotor 11 of the electric motor, no attempt has been made to illustrate other details thereof.

The rotor 11 comprises a stack of annular laminations 12 mounted upon a spider 13 which in turn is fixed to the shaft 8. The spider 13 has a hub 14 bored to receive the shaft 8, and outwardly extending radial arms 15. The outer ends of these arms are transversely enlarged and are turned to a diameter slightly less than that of the hole in the annular laminations 12. In other words the inner peripheries of the laminations 12 are directly seated upon the outer curved ends of the spider arms.

The laminations 12 are identical and are preferably punched from thin sheet steel. As is customary their outer peripheral portions have radial notches or slots as they are often called to receive conductor bars 16. These conductor bars pass longitudinally through the stack of laminations and have their ends secured to and connected by end rings 17.

By extending the conductor bars a substantial distance beyond the ends of the stack of laminations, the heat developed in the rotor is carried out to a point where it is more easily dissipated to the cooling air moving through the motor. Ordinarily this expedient is sufficient to carry off the heat from the rotor especially where external means are provided to induce air flow through the motor as for instance an air blast hood 18 mounted above the motor as in Figure 1.

For the type of service described hereinbefore, extending the conductor bars to the full length permitted by the frame size of the motor and even supplying external means for forcing air through the motor was insufficient to satisfactorily carry off the heat developed in the rotor. Thus with a view toward improving the dissipation of heat from the rotor the inner peripheral portions of the laminations are notched as at 19. The notches 19 are relatively closely spaced so that a plurality of such notches lies between each pair of adjacent spider arms.

The longitudinal air passages 20 which extend through the rotor and are defined by the sides of the spider arms, part of the hub and the inner periphery of the stack of laminations are not only increased in capacity by the notches 19, but the walls thereof defined by the laminations have their surface areas materially increased. Consequently the air moving through the longitudinal passages 20 comes in contact with a considerably greater portion of the laminations and thus more effectively carries off the heat generated therein. The notches 19 also bring the air passages closer to the source of the heat, namely the outer peripheral portion of the rotor.

Notching the inner periphery of the laminations in the manner described presented difficulties in the mounting of the rim of the rotor, that is, the stack of laminations, upon the spider. These difficulties are overcome in the present invention in a simple direct manner. As already noted, the annular laminations fit freely over the spider, the hole through the laminations being slightly larger than the diameter to which the arms of the spider are turned.

One of the spider arms has a keyway 21 cut into its outer face and extending diagonally thereacross. The other spider arms have no keyways. Seated in the keyway 21 is a key 22. Each of the other spider arms has a key 23 resting against the outer face thereof. The height of these other keys above the spider arms upon which they rest is equal to the exposed portion of the key 22, and the cross-section of the exposed portion of the key 22 and of the keys 23 is slightly less than the size of the notches 19. Thus the keys 22 and 23 fit within the notches 19. The slightly diagonal position of the keyway 21 and the key 22 therein imparts the necessary "skew" to the laminations.

In assembling the rotor, the spider with the keys 22 and 23 in place, is set vertically into a jig and then one of a pair of end rings 24 is slipped over the keys to be supported against dropping by small blocks 25 set into notches 26 in the ends of the keys. Thereupon the laminations are stacked upon the spider and as this stacking proceeds, the proper rotational disposition of each lamination will be determined by the key 22 without hindrance from any of the other keys 23 which at this stage are free to shift transversely of their respective spider arms.

After all the laminations have been placed in position, the second end ring 24 is fitted over the keys and then the stack of laminations is subjected to endwise pressure until the upper side of the top end ring 24 fully uncovers the adjacent cross notches 26. Blocks 25 are then inserted in these notches so that upon relieving the endwise pressure on the assembly, the resiliency of the stack of laminations reacting against the end rings holds the parts against displacement.

The end portions of the keys 23 are then welded to the spider arms as at 27. The blocks 25 are also welded to the keys and to the end rings as at 28 and 29.

The conductor bars 16 are now driven through the aligned notches or slots in the outer peripheral portions of the laminations, and with their proper disposition and securement to the rings 17 the rotor is complete except for any machining or dressing up that may be necessary or desirable.

From the foregoing description taken in connection with the accompanying drawings, it will be readily apparent to those skilled in the art that this invention provides a new and novel construction for the rotor of electric motors which, though it employs an extremely simple expedient, nevertheless solves a problem that has confronted the industry for many years.

What I claim as my invention is:

1. A rotor for electric motors comprising a spider having a hub and radially outwardly projecting angularly spaced arms, the outer end surfaces of which are equi-spaced from the rotor axis; a stack of annular laminations encircling and mounted upon said spider arms with the inner peripheral portions of the laminations seated on the outer end surfaces of the arms, said inner peripheral portions of the laminations having a multiplicity of angularly spaced notches with the spacing therebetween considerably less than the angular spacing between the spider arms; one of said spider arms having a keyway in its outer end; a key seated in said keyway and received in one of said notches of each of the laminations whereby said key aligns the notches of all of the laminations; a key received in aligned notches opposite each of said spider arms, said other keys being seated upon the outer end surfaces of the spider arms; and welding securing each of said other keys to its respective spider arms so that said other keys coact with the first named key to secure the stack of laminations against turning with respect to the spider.

2. A rotor for electric motors comprising a spider having a hub and radially outwardly projecting angularly spaced arms, the outer end surfaces of which are equi-spaced from the rotor axis; a stack of annular laminations encircling and mounted upon said spider arms with the inner peripheral portions of the laminations seated on the outer end surfaces of the arms, said inner peripheral portions of the laminations having a multiplicity of angularly spaced notches with the spacing therebetween considerably less than the angular spacing between the spider arms; one of said spider arms having a keyway in its outer end; a key seated in said keyway and received in one of said notches of each of the laminations whereby said key aligns the notches of all of the laminations; a key received in aligned notches opposite each of said spider arms, said other keys being seated upon the outer end surfaces of the spider arms; welding securing each of said other keys to its respective spider arm so that said other keys coact with the first named key to secure the stack of laminations against turning with respect to the spider; clamping rings surrounding the keys and engaging the ends of the stack of laminations; and means securing said clamping rings to the keys.

3. A rotor for electric motors comprising a spider having a hub and radially outwardly projecting angularly spaced arms, the outer end surfaces of which are equi-spaced from the rotor axis; a stack of annular laminations encircling and mounted upon said spider arms with the inner peripheral portions of the laminations seated on the outer end surfaces of the arms, said inner peripheral portions of the laminations having a multiplicity of angularly spaced notches with the spacing therebetween considerably less than the angular spacing between the spider arms; one of said spider arms having a keyway in its outer end; a key seated in said keyway and received in one of said notches of each of the laminations whereby said key aligns the notches of all of the laminations; a key received in aligned notches opposite each of said spider arms, said other keys being seated upon the outer end surfaces of the spider arms; welding securing each of said other keys to its respective spider arm so that said other keys coact with the first named key to secure the stack of laminations against turning with respect to the spider; clamping rings surrounding the keys and engaging the ends of the stack of laminations; and means securing said clamping rings to the keys, said securement of the clamping rings to the keys comprising a block set into a notch in each key in a position to engage the adjacent outer face of the clamping ring, and welding securing said blocks to the clamping ring and keys.

4. The hereindescribed method of making a rotor for an electric motor having a stack of punched annular laminations encircling and mounted upon a spider having a hub and outwardly projecting angularly spaced arms with a key secured to each of a number of said arms received in aligned notches in the inner peripheries of the laminations, characterized by the steps of: securing one of said keys to its spider arm prior to the assembly of the laminations upon the spider; positioning the other keys against their respective spider arms in a manner allowing some freedom of movement with respect thereto; assembling the laminations upon the spider with all of the keys thus in position; and subsequently securing said other keys to their respective spider arms.

5. The hereindescribed method of making a rotor for an electric motor, which comprises: producing a spider with a hub and angularly spaced arms projecting outwardly therefrom; turning the outer surfaces of the arms to a given diameter; cutting a keyway in the outer curved surface in one of said arms; placing a key in said keyway; holding the spider and key against relative displacement; positioning and holding a key against the curved outer surface of each of the other spider arms in a manner allowing some freedom of movement of said keys transversely with respect to their respective spider arms; placing a ring around all of the keys; securing the ring against movement longitudinally of the keys in one direction; punching annular laminations with the hole therein substantially the same diameter as that to which the spider arms are turned, and with a plurality of circumferentially closely spaced notches in their inner peripheries; assembling a stack of the annular laminations on the spider with each key entering one of the notches in the inner periphery of the laminations; placing another ring around all of the keys; applying axial pressure to the assembled stack of laminations and the rings; securing the last named ring to the keys to hold the ring against outward axial displacement; and finally welding all of the keys other than the first named key to their respective spider arms.

6. A rotor for electric motors comprising: a spider having a hub and angularly spaced arms radiating therefrom, the outer end surfaces of said arms being equi-spaced from the rotor axis; a stack of annular laminations encircling and mounted upon said spider arms with the inner peripheral portions of the laminations seated upon the outer end surfaces of the arms, said inner peripheral portions of the laminations having a plurality of angularly spaced notches with the spacing therebetween considerably less than the angular spacing between the spider arms to thus provide a large surface for the dissipation of heat from the laminations by convection to cooling air moving between the spider arms; and means securing the stack of laminations against rotation with respect to the spider comprising key means fixed on the spider arms and engaging in certain of said notches overlying the ends of the arms.

THEODORE R. WIESEMAN.

REFERENCES CITED

The following references are of record in the file of this patent:

UNITED STATES PATENTS

| Number | Name | Date |
| --- | --- | --- |
| 587,765 | Short | Aug. 10, 1897 |
| 890,577 | Richards | June 9, 1908 |
| 789,454 | Reist | May 9, 1905 |